Figure 1:
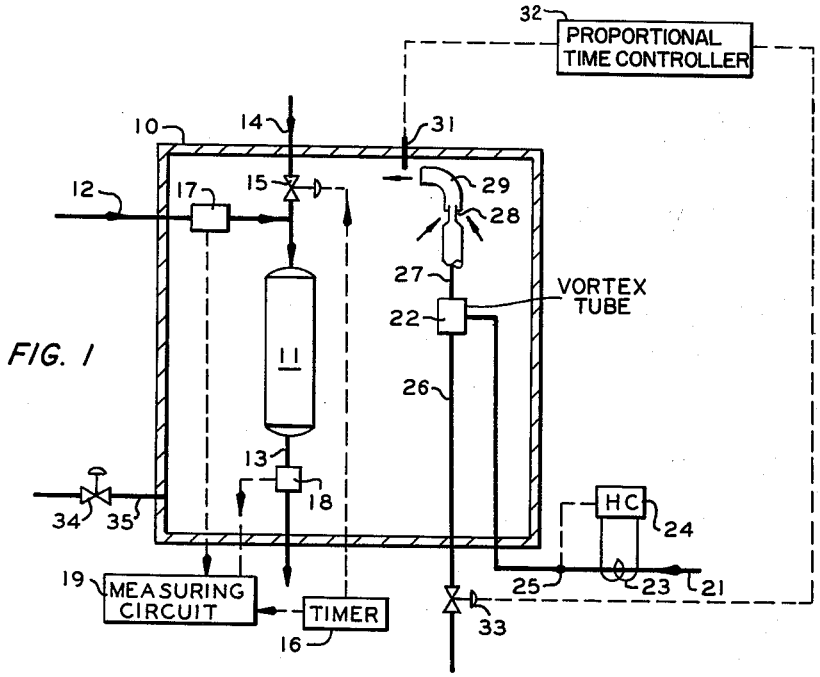

INVENTORS
C. J. RAIBLE
R. A. SANFORD
BY
*Young & Quigg*
ATTORNEYS

United States Patent Office

3,165,149
Patented Jan. 12, 1965

3,165,149
TEMPERATURE CONTROL SYSTEM
Clarence J. Raible and Richard A. Sanford, Bartlesville, Okla., assignors to Phillips Petroleum Company, a corporation of Delaware
Filed July 8, 1963, Ser. No. 293,511
1 Claim. (Cl. 165—30)

This invention relates to method and apparatus for controlling the temperature of a system. In one aspect the invention relates to controlling a temperature bath. In another aspect the invention relates to a chromatographic analysis system adapted to operate at reduced temperatures. In yet another aspect the invention relates to method and apparatus for regulating the temperature in an instrument housing. In a still further aspect the invention relates to method and apparatus for controlling the temperature in a system within the range of ambient temperature.

A standard practice for controlling the operating temperature of laboratory and automatic on-stream instrument is to thermostat the instrument at a sufficiently high temperature, such as 150° F., so that some supplementary heat must be added by the control system at the highest ambient temperature. Additional amounts of supplemental heat must be added by the control system at lower ambient temperature.

However, many instruments such as the chromatographic analyzer, operate at significantly increased efficiency at lower temperature, such as in the range of —40° F. to 140° F. Complications arise, however, when the desired operating temperature of the instrument is within the normal range of ambient temperature. One of these complications is that part of the time there is a need for supplemental heat to be added to the system and part of the time there is a need for heat to be removed from the system.

In accordance with the present invention there is provided an improved temperature control system for maintaining the temperature of an object at a substantially constant desired value which can be within the normal range of ambient temperature comprising a Hilsch vortex tube having an inlet, a hot fluid outlet conduit and a cold fluid outlet conduit, a source of fluid at ambient temperature, conduit means for passing fluid from said source to the inlet of the vortex tube, means for passing the fluid from said cold fluid outlet conduit in heat exchanging relationship with said object, valve means positioned in said hot fluid outlet conduit, and means for regulating said valve means responsive to the temperature of said object.

In accordance with a further aspect of the invention there is provided an improved explosion-safe temperature control system for maintaining the temperature of an object at a substantially constant predetermined temperature which can be within the normal range of ambient temperature comprising a Hilsch vortex tube having an inlet, a hot fluid outlet conduit and a cold fluid outlet conduit, a source of fluid at ambient temperature, conduit means for passing fluid from said source to the inlet of the vortex tube, first and second three-way valves having the inlet thereof connected to said cold fluid outlet conduit and said hot fluid outlet conduit, respectively, means for passing fluid from the first outlet of each of said first and second three-way valves in heat exchanging relationship with said object, and means responsive to the temperature of said object for manipulating said first and second three-way valves to control the ratio of hot fluid to cold fluid passed in heat exchanging relationship with said object.

Accordingly, it is an object of the invention to provide an improved temperature control system. Another object of the invention is to increase the efficiency of operation of various instruments. Yet another object of the invention is to provide for an improved chromatographic analysis system. A still further object of the invention is to provide an improved control system for regulating a temperature within the normal range of ambient temperatures. Another object of the invention is to provide improved method and apparatus for regulating temperatures within an instrument housing. A still further object of the invention is to provide an explosion proof temperature control system.

Other aspects, objects, and advantages of the invention will be apparent from a study of the disclosure, the drawings, and the appended claim to the invention.

Figure 2:
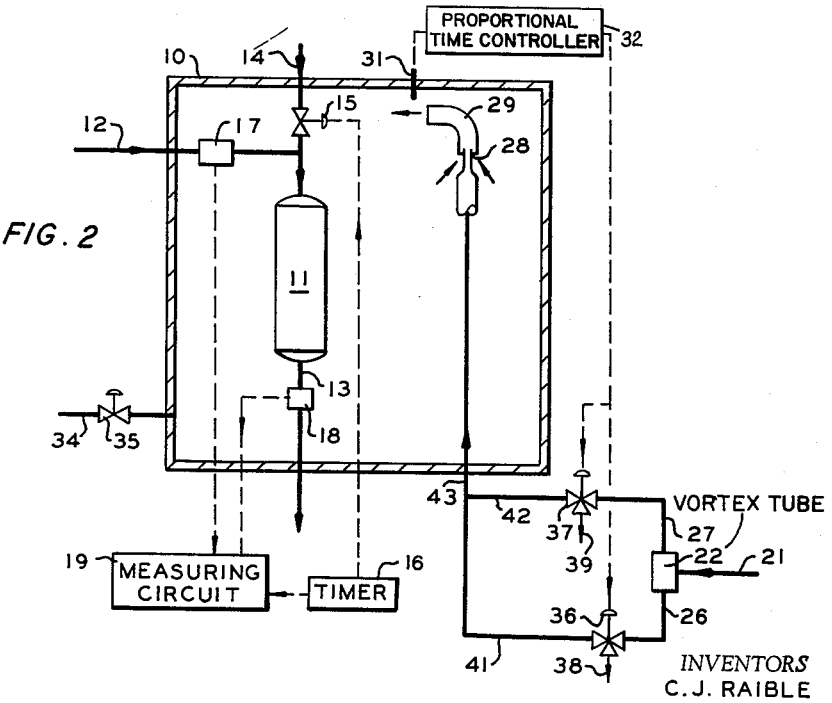

In the drawings FIGURE 1 is a schematic representation of a control system in accordance with the invention in combination with a chromatographic analysis system, and FIGURE 2 is a schematic representation of an explosion proof temperature control system in accordance with the invention.

Referring now to the drawing and to FIGURE 1 in detail there is shown a housing 10, which can be made of thermal insulating material, and which contains a conventional chromatographic column 11 which is filled with a packing material that selectively retards passage therethrough of constituents of a fluid mixture to be analyzed. A carrier gas is introduced into the first end of column 11 through a conduit 12. A conduit 13 removes the effluent from column 11. A sample conduit 14, having a control valve 15 therein, communicates with the first end of column 11. Valve 15 is opened periodically for a preselected time interval by means of a timer 16 so as to introduce a predetermined volume of fluid sample to be analyzed into column 11. Although shown schematically, valve 15 can be any type of sample valve known in the art which permits the introduction of a predetermined volume of fluid sample.

First and second sensing elements 17 and 18 are disposed in respective conduits 12 and 13. These elements are adapted to compare a property of the fluid flowing through the two conduits to provide an indication of differences therebetween. These detecting elements are advantageously temperature sensitive resistance elements. The detecting elements are connected into a measuring circuit 19 which can be any suitable measuring circuit known in the art. Before the sample fluid is introduced into column 11, carrier gas flows through conduits 12 and 13 so that elements 17 and 18 respond to the same fluid and have identical outputs. Valve 15 is then opened to introduce a sample into column 11. The carrier gas elutes the constituents of the sample from the column in sequence so that element 18 responds sequentially to these individual constituents.

In order to maintain the temperature in housing 10 at a substantially constant value within the normal range of ambient temperature, gas from a suitable source at ambient temperature, such as plant process air, is transmitted through conduit 21 to the inlet of Hilsch vortex tube 22. Where the lowest ambient temperature is particularly low, heating element 23 can be positioned in heat exchanging relationship with the fluid in conduit 21 and be regulated by heater controller 24 responsive to the temperature in conduit 21 downstream of heating element 23 as indicated by a temperature sensor-transmitter 25 to maintain such temperature substantially constant at a predetermined desired temperature. In an alternative embodiment, heater controller 24 can provide a constant flow of current through heating element 23. Heating the gas and then cooling it to the desired temperature is advantageous in avoiding the condensation of material, for example water vapor, which might occur if the gas was first cooled and then heated to the desired temperature.

Hilsch vortex tube 22 is also provided with a hot fluid outlet conduit 26 and a cold fluid outlet conduit 27. The operation of a Hilsch vortex tube is based on the Ranque-Hilsch effect. The gas passing through the inlet opening enters a tangential entry nozzle producing a vortex in the internal chamber. Energy distribution at this point is such that the heated fraction of the gas passes through the hot exit of tube 22 and conduit 26, while the cooled fraction of the gas, selected from the center mass of the vortex by a restricting orifice emerges through conduit 27. A more complete description of the vortex tube is set forth in U.S. Patent 1,952,281, issued March 27, 1934, and which is incorporated herein by reference. The drop in temperature below that of the inlet gas increases as the pressure drop between the inlet and cold outlet increases. For a given inlet pressure and outlet pressure, the temperature drop will be substantially constant regardless of variations in the inlet gas temperature.

The cooled gas from conduit 27 passes through Venturi section 28 to cause intimate mixing of the gas with the gas already in housing 10. The mixed gas passes through conduit 29 and into housing 10. A temperature sensing means 31, such as a thermocouple, transmits a signal to temperature controller 32 representative of the temperature within housing 10. In accordance with the invention a valve 33 is operatively positioned in conduit 26 and is manipulated by the output of temperature controller 32. The thermal response time of the vortex tube is substantially less than that of conventional indirect fluid heat exchangers or radiant heaters, and thus the regulation of the back pressure on the hot fluid outlet conduit provides a faster response time than, for example, varying the temperature of the inlet air by means of varying the current through an electrical radiant heater. In accordance with the presently preferred embodiment of the invention, temperature controller 32 is a proportional time controller which oscillates valve 33 between its opened and closed positions with the ratio of the period of time each cycle that valve 33 is closed to the period of time each cycle that valve 33 is opened being varied responsive to the output of temperature sensor-transmitter 31. The frequency of oscillation is preferably chosen sufficiently high to substantially avoid effecting a corresponding oscillation in the temperature of the object being regulated. The time required to change between cooling and non-cooling phases is almost instantaneous, thus eliminating difficulties encountered in time lag of heaters or indirect fluid coolers normally used to control a temperature.

While the proportional time controller is the presently preferred embodiment, controller 32 can be any suitable control means, for example, an on-off controller or a proportional band controller. In the on-off control system a drop in temperature of the object being regulated below the desired temperature would cause controller 32 to close valve 33, and thus cease the cooling operation of the vortex tube, until the temperature had risen to a value above the desired temperature, at which time controller 32 would open valve 33, and thus resume the cooling operation, until such time as the temperature again dropped below the desired value. In the proportional band control system valve 33 acts as a variable restriction and the temperature of the object is raised or lowered by decreasing or increasing, respectively, the flow through conduit 26. The proportional time control is presently preferred because of its rapidity and accuracy of response. Valve 34 in conduit 35 can be utilized to remove excess fluid from housing 10.

Referring now to FIGURE 2 there is shown a modification of FIGURE 1 wherein hot fluid outlet conduit 26 and cold fluid outlet conduit 27 are connected to the inlet ports of three-way valves 36 and 37, respectively. First outlet ports of valves 36 and 37, can be connected to a suitable vent by way of conduits 38 and 39, respectively. The second outlet ports of valves 36 and 37 are connected by way of conduits 41 and 42 to conduit 43 which feeds Venturi section 28. Temperature controller 32 regulates valve 36 to vary the amount of hot fluid from conduit 26 which is passed into conduit 43 by venting the remainder. Similarly temperature controller 32 regulates valve 37 to vary the amount of cold fluid passed from conduit 27 to conduit 43 by venting the remainder. Thus controller 32 controls the ratio of the amount of hot fluid to the amount of cold fluid introduced into conduit 43, and thereby controls the temperature of the combined fluid.

The embodiments of FIGURES 1 and 2 are particularly advantageous where it is desired to provide an explosion-safe system in that the use of electrical heating elements can be avoided while maintaining an accurate control system with fast response.

While the heat exchanging fluid presently preferred for utilization in the vortex tube is air, any suitable fluid can be utilized. While the invention has been illustrated in combination with a chromatographic analysis system, it is within the contemplation of the invention to control the temperature in any instrument housing, temperature bath, or the temperature of any object, for example, refractometers, capacitance measuring devices, gravitometers, and the like. While the invention has been illustrated for controlling a temperature within the normal range of ambient temperature, it can be utilized to heat above or cool below such range. Thus, it is within the contemplation of the invention to reverse the position of the vortex tube in FIGURE 1 such that conduit 27 is the hot fluid outlet conduit and conduit 26 is the cold fluid outlet conduit.

Reasonable variation and modification are possible within the contemplation of the foregoing disclosure, drawing and appended claim to the invention.

We claim:

A temperature control system including a chromatographic analyzer and means for maintaining the temperature of said chromatographic analyzer at a substantially constant value within the normal range of ambient temperature which comprises a vortex tube having an inlet, a hot fluid outlet and a cold fluid outlet; a source of fluid at ambient temperature; conduit means for passing fluid from said source to said inlet of said vortex tube; heating means in heat transferring relationship with the fluid in said conduit means for heating the fluid in said conduit means to a predetermined temperature above maximum ambient temperature; means for passing only fluid from said cold fluid outlet in heat exchanging relationship with said chromatographic analyzer; a hot fluid outlet conduit connected to said hot fluid outlet; an on-off valve means positioned in said hot fluid conduit to completely close said hot fluid outlet when said valve means is in its off position; means for measuring the temperature of said chromatographic analyzer and establishing a first signal representative thereof; a proportional time temperature controller; means for applying said first signal to an input of said proportional time temperature controller, and means responsive to the output of said proportional time temperature controller for actuating said valve means between the on position to cause said vortex tube to effect a temperature drop in the fluid between said inlet and said cold fluid outlet and the off position to prevent said vortex tube from effecting a temperature drop in the fluid between said inlet and said cold fluid outlet, the frequency of oscillation between said on position and said off position being sufficiently high to substantially avoid effecting a corresponding oscillation in the temperature of said chromatographic analyzer.

References Cited in the file of this patent

UNITED STATES PATENTS

| | | |
|---|---|---|
| 2,583,906 | Van Guilder | Jan. 29, 1952 |
| 2,737,028 | Machlanski | Mar. 6, 1956 |
| 2,819,590 | Green | Jan. 14, 1958 |
| 3,062,037 | Donner et al. | Nov. 6, 1962 |
| 3,122,014 | Dobbins | Feb. 25, 1964 |